O. H. TONGBERG.
STONE CUTTING MACHINE.
APPLICATION FILED DEC. 15, 1915.

1,247,596.

Patented Nov. 20, 1917.

INVENTOR:
Otto H. Tongberg
by MacLeod, Calver, Copeland & Dike
Attys.

UNITED STATES PATENT OFFICE.

OTTO H. TONGBERG, OF LYNN, MASSACHUSETTS, ASSIGNOR, BY MESNE ASSIGNMENTS, TO J & G MANUFACTURING CO., OF LYNN, MASSACHUSETTS, A CORPORATION OF MASSACHUSETTS.

STONE-CUTTING MACHINE.

1,247,596.  Specification of Letters Patent.  Patented Nov. 20, 1917.

Application filed December 15, 1915. Serial No. 66,932.

*To all whom it may concern:*

Be it known that I, OTTO H. TONGBERG, a citizen of the United States, residing at Lynn, county of Essex, State of Massachusetts, have invented a certain new and useful Improvement in Stone-Cutting Machines, of which the following is a specification, reference being had therein to the accompanying drawings.

My invention has for its object a new and improved form of stone cutting saw which is adapted to be used in connection with stone cutting machines of usual form. The saw consists of a transverse bar and a plurality of teeth secured thereon at predetermined intervals, the whole being so constructed and arranged to enable any depth of cut to be obtained and also to enable a relatively greater pressure than has heretofore been possible to be applied to the blades so that the sawing operation is capable of being performed more quickly than heretofore so far as known to me. The blades or teeth are provided with openings centrally thereof through which the bar is received and are secured to the bar by wedges or other suitable means, the construction being such that the blades and bar are locked tightly together and are prevented from twisting or bending under a heavy pressure so that a straight clean cut is produced. Furthermore spaces are provided between the transverse bar and the walls of the cut to permit the cutting element, such as steel shot to be readily fed in beneath the blades or teeth while the saw is in operation. A further object of my invention is to so arrange the saw that the blades may be reversed so that the other end of each blade or tooth may be employed when one end has become worn. The saw embodying my invention also makes it possible to renew worn teeth from time to time as required, although usually they will be renewed at the same time. Also one or more teeth may be removed from the ends of the saw when a small stone is to be cut.

The invention will be fully understood when taken in connection with the accompanying drawings and the novel features thereof will be pointed out and clearly defined in the claims at the close of this specification.

In the drawings,—Figure 1 is a front elevation of a portion of a stone cutting machine provided with a saw embodying my invention showing the saw in position after having cut partly through a block of stone, the block of stone being shown in section.

Figure 1:
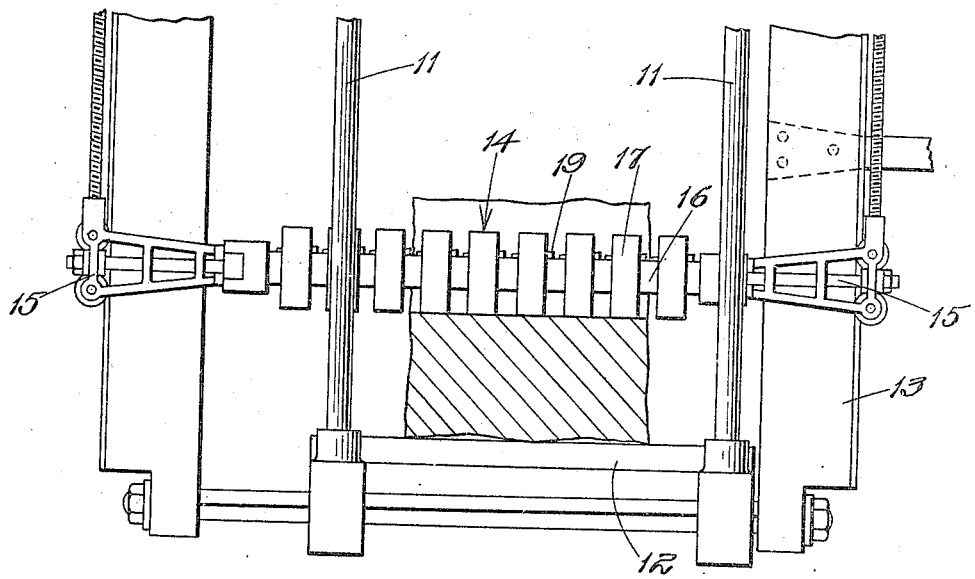
Figure 2:
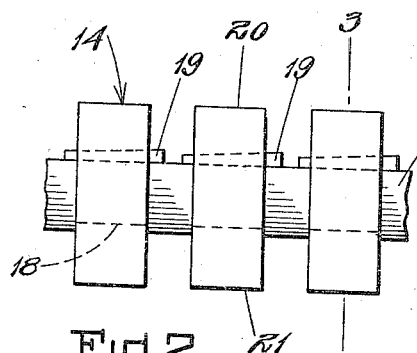
Fig. 2 is a detail enlarged showing a portion of the saw embodying my invention.

Having reference to the drawings there is shown the lower portion of a stone cutting machine which may be of any usual form. The machine shown consists of a frame having uprights 11 and a base 12 on which is mounted a saw carriage 13 which is adapted to be reciprocated in any well known manner. The saw 14 is mounted at each end on saw carrying brackets 15 which are moved downwardly as the carriage reciprocates in a manner well known to those skilled in the art.

Figure 3:
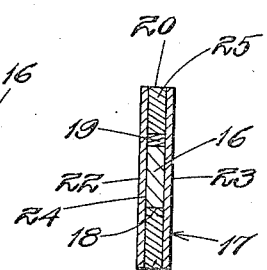
Fig. 3 is a section on line 3—3 of Fig. 2.
Figure 4:
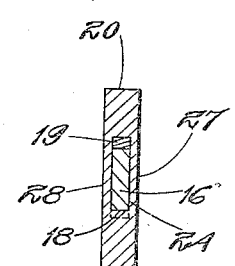
Fig. 4 is a view similar to Fig. 3 showing a modified form of saw blade.
Figure 6:
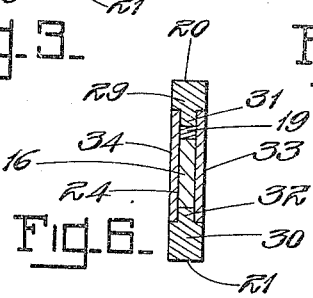
Fig. 6 is a section on line 6—6 of Fig. 5.

The saw 14 consists of a transverse member or bar 16 which is secured to the carrier brackets 15 at each end, and of blades or teeth 17 which are secured at predetermined intervals on the transverse bar 16 as shown. The transverse bar 16 consists of a metallic bar of rectangular cross section as is shown in Figs. 3, 4 and 6 of the drawings. The lower surface of the bar 16 is provided with notches or cut away portions 18 which are adapted to coöperate with wedges 19 to hold the teeth 17 in position on the bar 16 in a manner to be described.

The blades or teeth 17 are of rectangular shape and as shown in the drawings are of substantially twice the thickness of the bar 16. They consist of cutting ends 20 and 21 which are secured together by connecting members 22, 23 spaced apart to form a rectangular opening 24 centrally of the blade or tooth. In the preferred form which is shown in Fig. 3, the connecting members 22, 23 form a portion of the cutting ends 20 and 21. In this form each end of the connecting members 22, 23 have blocks 25, 26 interposed between them which may be secured to the connecting members in any suitable manner as by spot welding or the like. In the modified form shown in Fig. 4 the cutting ends 20 and 21 each consist of a single block of steel which are joined together by integral side connecting members 27, 28. The opening 24 is slightly longer than the vertical width of the bar 16 so that the blade 17 may be slid along the bar, and thus put on or removed. The width of the opening 24 is such that the blade makes a snug sliding fit with the bar to enable it to be moved along the bar as desired and at the same time to prevent any lateral play of the blades when the saw is in operation. The inner edge of each block 25, 26 is adapted to be received within the notches or cut away portions 18 in the lower surface of the bar 16 and the blades are held in position on the transverse member by the wedges 19 which draw the blades into the notches 18 and securely hold them in position. In this manner the blades are prevented from moving longitudinally on the bar 16 and are clamped securely in place and held against lateral movement, the connecting members 22, 23 fitting snugly about the sides of the bar and preventing them from bending or twisting under a heavy pressure. I consider this one of the important features of my invention for the pressure brought to bear on the blades is applied relatively closely to their cutting surfaces so that there is practically no chance for the blades to bend under a heavy pressure.

By inserting the bar 16 through the blades as described, I am enabled to provide spaces between the blades and between the sides of the bar and the wall of the cut so that the cutting element as iron or steel shot may be fed in after the saw has cut beyond its depth into the stone as is shown in Fig. 1. I regard this as important for in this manner I have combined a convenient manner of inserting the cutting element with a strong and rigid construction so that heavy pressure may be brought to bear upon the blades or teeth both being factors which are essential in order that the cutting operation may be performed quickly. Furthermore the blades or teeth may be reversed when one end has become worn. They may also be made of considerable length and may be used until worn down almost to the bar.

Figure 5:
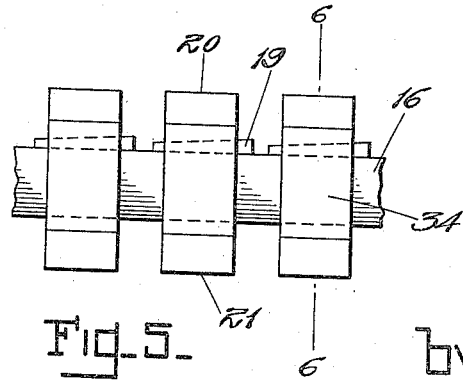
Fig. 5 is a detail enlarged showing a portion of a modified form of saw embodying my invention.

In Figs. 5 and 6 there is shown a modified form of cutting blade embodying my invention. This form of blade is so constructed that it may be manufactured more readily than the solid blade shown in Fig. 4 and at the same time it is provided with the solid cutting ends 20 and 21 like the blade shown in Fig. 4. The cutting ends 20 and 21 each consist of blocks 29 and 30 provided on their adjacent ends with ribs 31 and 32 respectively. The blocks 29 and 30 are joined by connecting members 33 and 34 having a space between them similar to the opening 24 in the blades described above which may be secured at their ends to the ribs in any well known manner as by spot welding or the like. This blade also has a pair of integral cutting surfaces.

What I claim is:

1. The improved stone cutting saw comprising a bar; a blade of greater thickness than said bar having a rectangular opening to receive said bar; and a wedge in said opening having a flat side adapted to bear on one edge of said bar while its opposite inclined face bears against an end wall of said opening to lock said blade in adjusted position.

2. The improved stone cutting saw comprising a bar, a blade of greater width than said bar having an opening therein through which said bar is adapted to be received, said bar having a notch in one edge in which a portion of said blade adjacent one side of said opening is adapted to be received, and a wedge in said opening between the opposite edge of said bar and the opposite side of said opening whereby said blade is secured in position.

3. The improved stone cutting saw comprising a bar having a plurality of separated notches in one edge thereof; a plurality of blades of greater thickness than said bar and having openings extending transversely therethrough adapted to receive said bar; and means for locking said blades in said notches.

4. The improved stone cutting saw comprising a bar having a plurality of separated notches in one edge thereof; a plurality of blades of greater thickness than said bar and having openings extending transversely therethrough adapted to receive said bar, said blades having the same width as said notches; and means for locking said blades in said notches with the end walls of said notches abutting the side edges of said blades.

5. The improved stone cutting saw comprising a bar having a pair of shoulders perpendicular to one edge thereof; a blade having an opening extending transversely therethrough to receive said bar and adapted to be positioned thereon between said shoulders, and means for locking said blade in adjusted position.

6. The improved stone cutting saw comprising a bar having a plurality of notches in one edge thereof; a blade with oppositely disposed cutting ends and having an opening extending transversely therethrough to receive said bar; and means for locking said blade in one of said notches with either cutting end in operative position.

In testimony whereof I affix my signature, in presence of two witnesses.

OTTO H. TONGBERG.

Witnesses:
GEORGE P. DIKE,
ALICE H. MORRISON.

Copies of this patent may be obtained for five cents each, by addressing the "Commissioner of Patents, Washington, D. C."